United States Patent
Galbiati

(10) Patent No.: US 8,207,695 B2
(45) Date of Patent: Jun. 26, 2012

(54) CONTROL CIRCUIT OF A FULL-BRIDGE STAGE

(75) Inventor: Ezio Galbiati, Agnadello (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 480 days.

(21) Appl. No.: 12/490,989

(22) Filed: Jun. 24, 2009

(65) Prior Publication Data

US 2010/0001667 A1    Jan. 7, 2010

(30) Foreign Application Priority Data

Jul. 1, 2008  (IT) .............................. VA2008A0040

(51) Int. Cl.
    H02P 6/00    (2006.01)
(52) U.S. Cl. .......... 318/400.29; 318/400.04; 318/400.02
(58) Field of Classification Search ............. 318/400.29, 318/400.04, 400.02, 400.3, 400.34, 400.11; 363/20
    See application file for complete search history.

(56) References Cited

U.S. PATENT DOCUMENTS

| 5,828,558 A | * | 10/1998 | Korcharz et al. | ............... | 363/20 |
| 5,917,720 A | | 6/1999 | Galbiati | ......................... | 363/98 |
| 6,995,537 B1 | | 2/2006 | Plutowski et al. | ............ | 318/590 |

FOREIGN PATENT DOCUMENTS

EP    1 641 115 A1    3/2006
* cited by examiner

*Primary Examiner* — Karen Masih
(74) *Attorney, Agent, or Firm* — Allen, Dyer, Doppelt, Milbrath & Gilchrist, P.A. Attorneys at Law

(57) ABSTRACT

A control circuit for a full-bridge-stage to drive an electric load includes PWM generation circuitry for generating first and second PWM signals so that a difference between duty-cycles of the PWM signals represents an amplitude of a drive current. A logic XOR gate is input with the first and second PWM signals and generates a logic XOR signal. A logic sampling circuit generates a logic driving command of a half-bridge stage, a logic value of which corresponds to a sign of the drive current, by sampling one of the first and second PWM signals based upon active switching edges of the logic XOR signal. A second XOR gate generates a third PWM driving signal of the other half-bridge of the full-bridge stage, a duty-cycle of which corresponds to the amplitude of the drive current.

12 Claims, 7 Drawing Sheets

CONTROL CIRCUIT OF A FULL-BRIDGE STAGE

FIELD OF THE INVENTION

This invention relates to the PWM driving of electric loads and, more precisely, to a control circuit of a full-bridge power stage that generates a logic driving command representative of the sign of the current to be forced through an electric load supplied by the power stage, and a PWM signal representative of the intensity of the current.

BACKGROUND OF THE INVENTION

Pulse Width Modulation, or shortly PWM, is largely used for controlling electric loads. FIG. 1 depicts a driving circuit, disclosed in the U.S. Pat. No. 5,917,720 in the name of the same applicant, of an inductive electric load, schematically represented by the resistor $R_L$ and the inductor $L_L$ connected in series, that uses a full-bridge power stage controlled by the pulse width modulation signals PwmA and PwmB. A sense amplifier SENSE AMPLIFIER senses the voltage drop on a sense resistor $R_S$ and generates a feedback signal that is subtracted by an error amplifier ERROR AMPLIFIER from an input signal Vin, and that represents the current to be forced through the electric load. The error signal Err is compared with two triangular ramp signals Tria1 and Tria2 for generating the pulse width modulation signals PwmA and PwmB.

Waveforms of the current Ivcm through the voice-coil motor and of the pulse width modulation signals PwmA and PwmB and of their difference Diff are shown in FIG. 2. The sign and the intensity of the current through the load Ivcm are controlled by adjusting the duty-cycle of the pulse width modulation signals PwmA and PwmB. When the duty-cycle of the signal PwmA is larger than 50% and the duty-cycle of the signal PwmB is smaller than 50%, the sign of the current Ivcm is as illustrated in the cited figure. The sign is inverted in the opposite case. The current is nullified by making the duty-cycles of the signals PwmA and PwmB equal to 50%.

This technique may be implemented with a sense amplifier SENSE AMPLIFIER for sensing the current flowing through the winding of the motor, having a high common mode rejection to the switching frequency in the whole range from ground voltage to the supply voltage.

Control circuits of a full-bridge power stage have been proposed in which the switches of a half-bridge are driven in PWM mode and the switches of the other half-bridge are either in a low or high saturation functioning condition, depending on the sign of the current to be forced through the electric load.

In the European patent application EP 1,641,115, herein incorporated by reference, a control system is proposed, the block diagram of which is represented in FIG. 3, that generates a logic driving signal of the switches of a half-bridge the value of which fixes the direction of the current through the load, and a drive PWM signal having a duty-cycle corresponding to the amplitude of the current to be forced through the load. The voltage difference at the inputs of the sense amplifier SENSE AMPLIFIER is referred either to a ground potential or to the supply voltage, thus it may not be indispensable to choose a sense amplifier having a high common mode rejection ratio in the whole voltage range from ground to the supply voltage, but it is sufficient that the common mode rejection ratio be sufficiently large for extreme voltages.

A detailed scheme of the control circuit of this prior document is depicted in FIG. 4. In order to reduce the absorbed power for low working currents, the control circuit is provided of linear amplifiers 5, 6 for driving the load in linear mode when the absolute value of the current is smaller than a pre-established threshold.

A characteristic of the system of FIG. 3 includes generating, with a comparator of the feedback loop, the logic driving signal that establishes the sign of the current through the load.

The U.S. Pat. No. 6,995,537 discloses a control circuit, depicted in FIG. 5, wherein the logic driving signal of the switches of a half-bridge that establishes the sign of the current is generated within the feedback loop. This circuit is adapted to control also low resistance electric loads (for example, about 5Ω) that may generate a relatively large back-electromotive force (for example, for voice-coil motors, of 5V or 6V). More particularly, it is effective also when the load absorbs small currents (for example smaller than 200/300 mA) and the back electromotive force is in phase with the forced current. Such a critical situation may occur, for example, while driving voice-coil motor for moving read/write heads of hard disks during seek operations, at the instant in which the current is inverted for braking the motor, that is moving at a relatively high speed.

A characteristic of the control system of FIG. 5 includes generating the logic driving signal that establishes the sign of the current, by an analog comparator for comparing the output of the error amplifier ERROR AMPLIFIER with a reference threshold.

SUMMARY OF THE INVENTION

An improved control circuit of a full-bridge power stage driving an electric load has been found. The control circuit generates a PWM driving signal of the switches of a half-bridge the duty-cycle of which corresponds to the intensity of the other half-bridge that determines the sign of the current to be forced through the load, such to reduce effectively spurious switching of the logic driving signal.

The PWM and logic driving signals are generated within the feedback loop by logically combining the signals PwmA and PwmB of the circuit of FIG. 1. In particular, the logic driving signal is obtained by sampling either the signal PwmA or PwmB based upon active switching edges of the logic XOR signal of the signals PwmA and PwmB, and the PWM logic signal is obtained as the logic XOR of the logic driving signal and of the logic XOR of the signals PwmA and PwmB.

In this way the logic driving signal that is produced is substantially free from spurious switching because it has not been obtained through a comparison of the output voltage of the error amplifier, that is corrupted by switching noise, with a reference threshold.

DETAILED DESCRIPTION OF THE PREFERRED EMBODIMENTS

The driving signals that fix the amplitude (PwmC) and the sign (Dir) of the current through the load are generated by the control circuit by combining the driving signal PwmA and PwmB generated according to any suitable technique, such as, for example, the technique disclosed in the prior patent U.S. Pat. No. 5,917,720, the disclosure of which is herein incorporated by reference.

Figure 1:
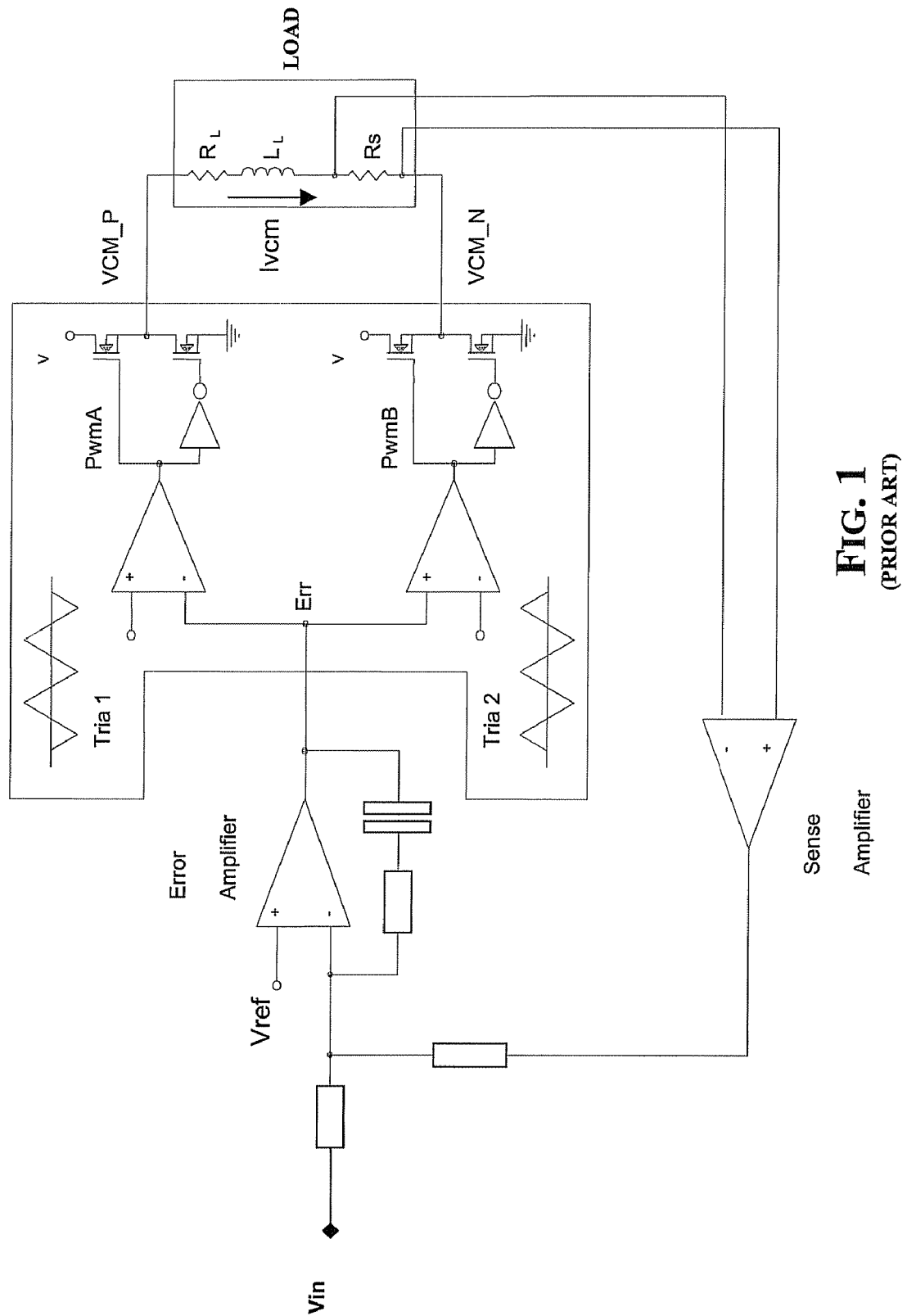
FIG. 1 depicts a current control circuit according to the prior art wherein the power stage is PWM controlled.
Figure 2:
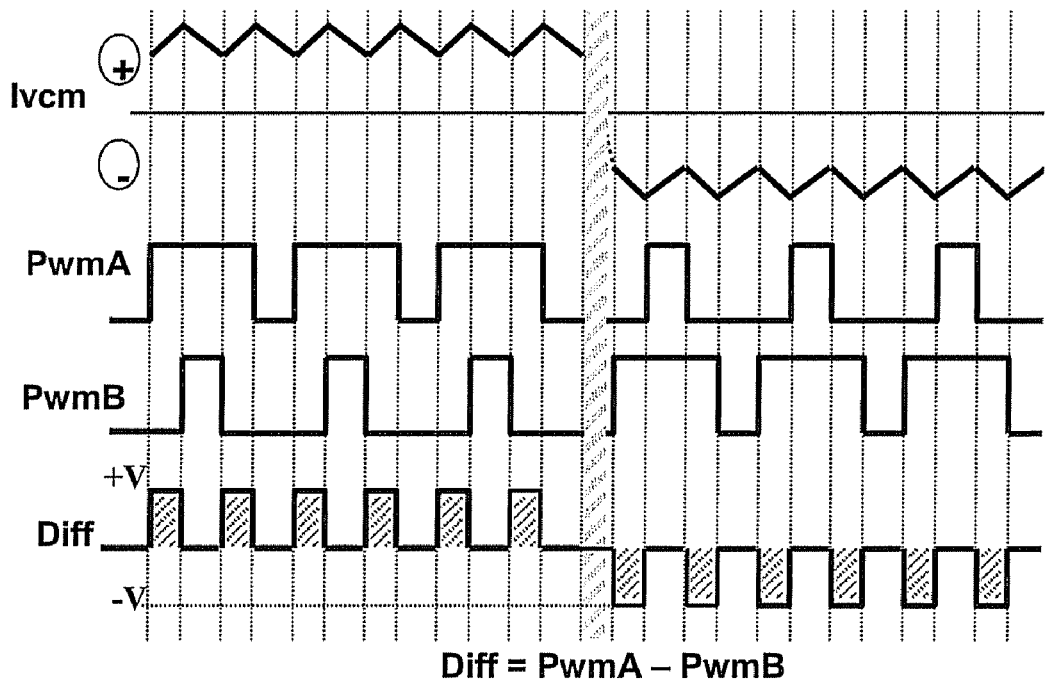
FIG. 2 is a time diagram that illustrates the functioning of the circuit of FIG. 1.
Figure 2:
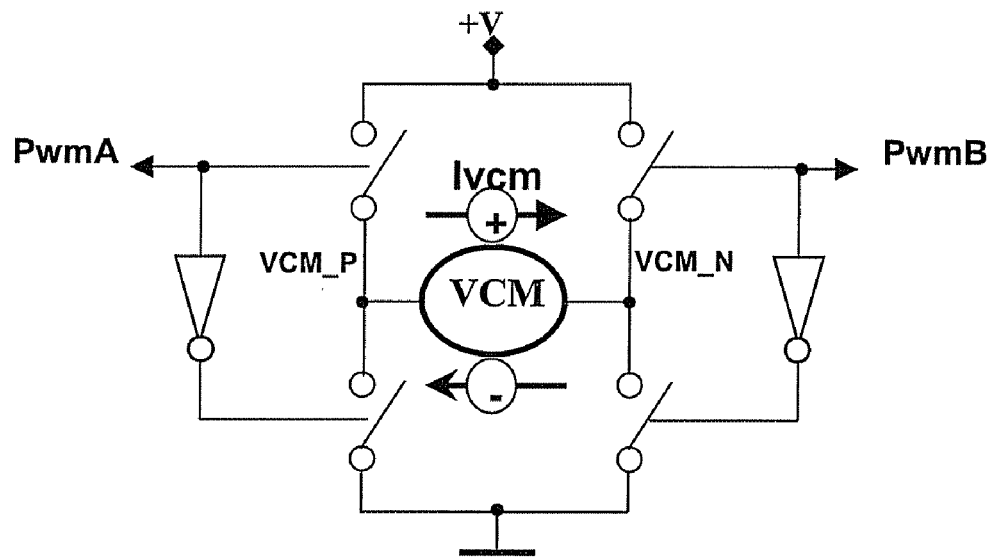
Figure 3:
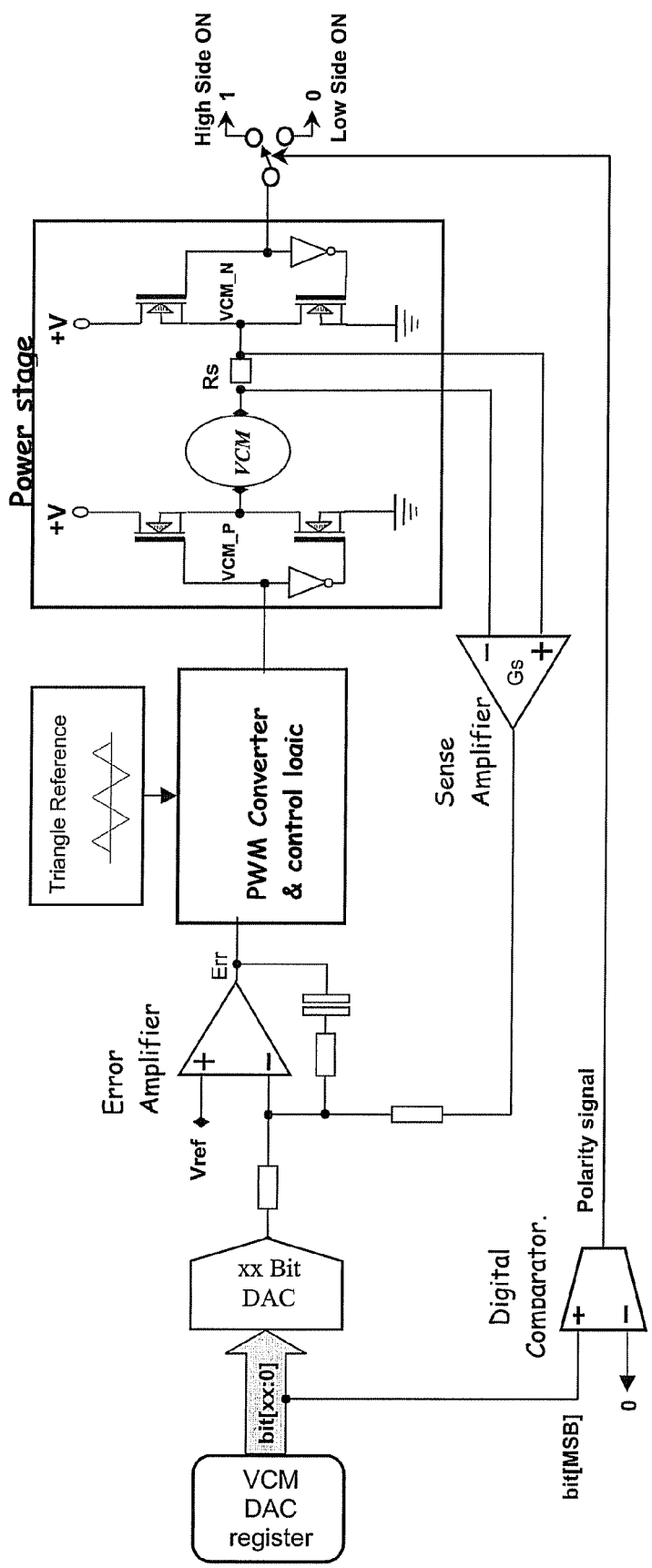
FIG. 3 illustrates a simplified scheme of a current control circuit according to the prior art wherein the half-bridge that establishes the sign of the current forced through the load is controlled by a circuit block out of the feedback loop.
Figure 4:
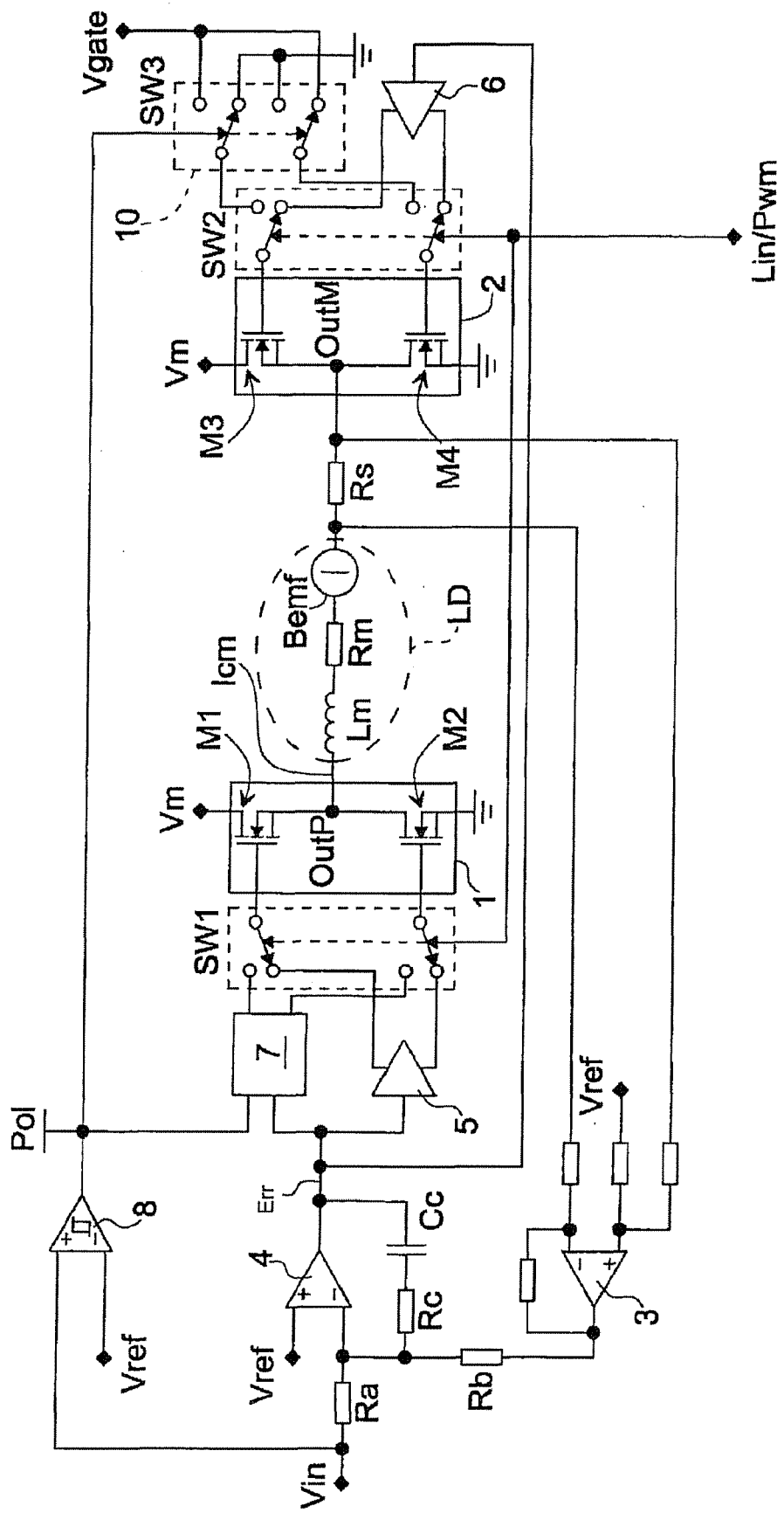
FIG. 4 is a detailed view of the current control circuit of FIG. 3.
Figure 5:
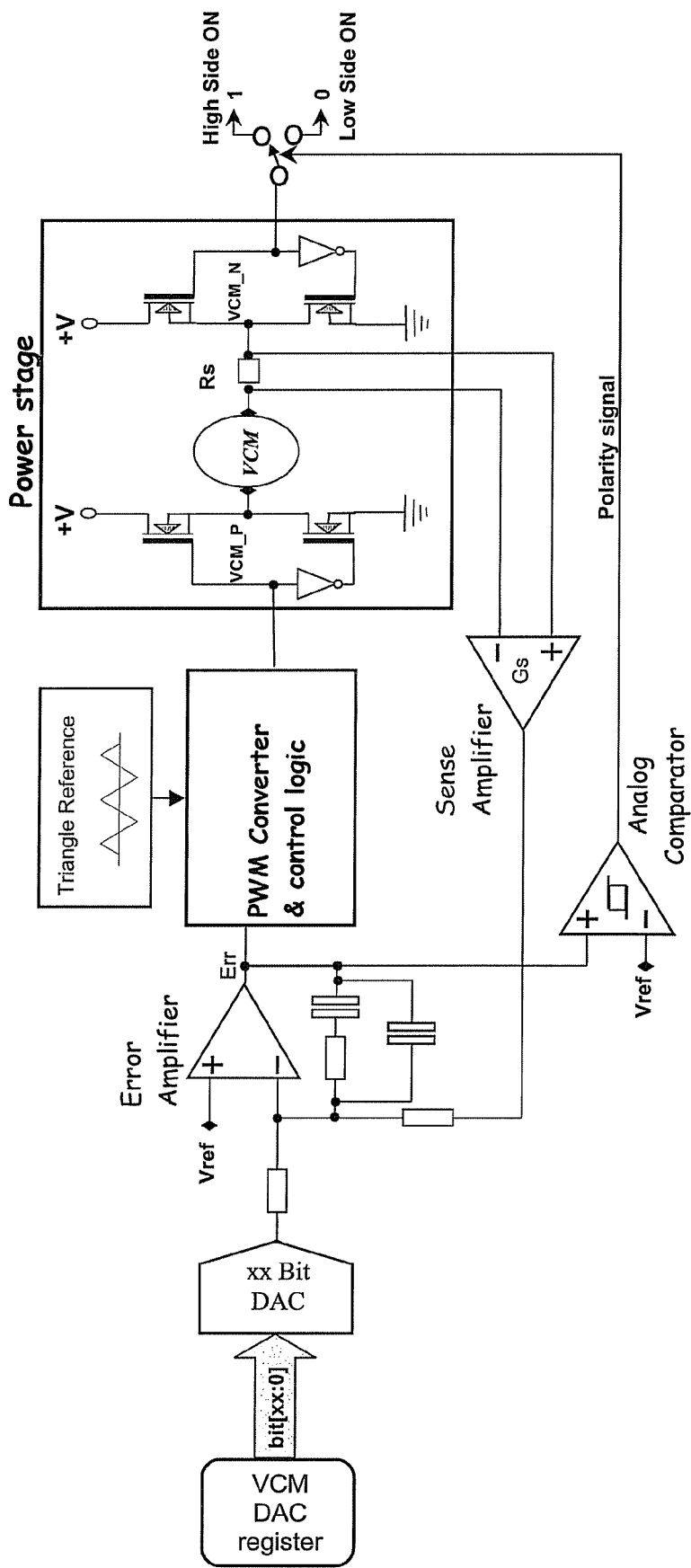
FIG. 5 depicts a current control circuit according to the prior art wherein the half-bridge that fixes the sign of the current forced through the load is controlled by an analog comparator with hysteresis that compares the output of the error amplifier with a signal that represents the virtual zero.
Figure 6:
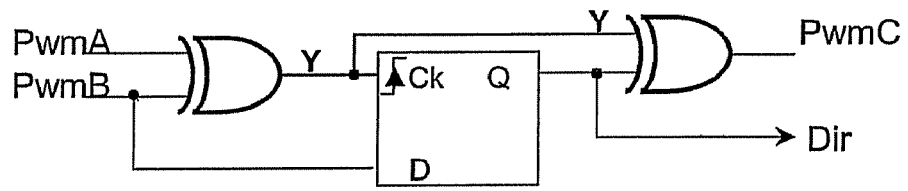
FIG. 6 depicts an embodiment of the logic portion of the control circuit of this invention that generates the logic driving signal (Dir) representative of the sign of the current to be forced the PWM signal (PwmC) representative of the amplitude of the current to be forced.

FIG. 6 depicts an exemplary logic circuit that combines the signals PwmA and PwmB for generating the driving signals PwmC and Dir supplied to respective half-bridges of the power stage, for determining the magnitude and sign, respectively, of the current forced through the load.

Figure 7:
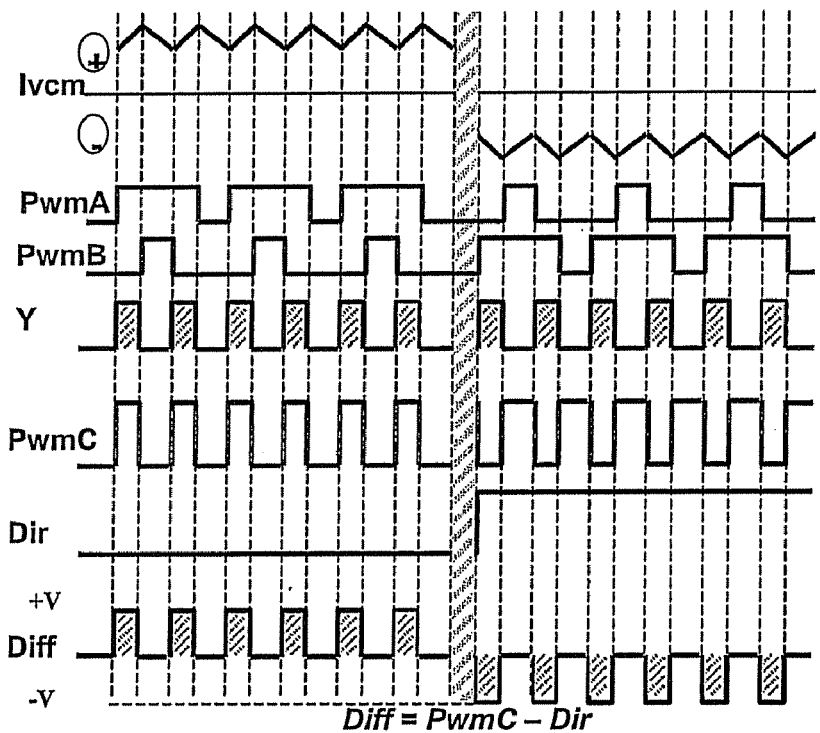
FIG. 7 is a time graph that illustrates the functioning of the circuit of FIG. 6.
Figure 7:
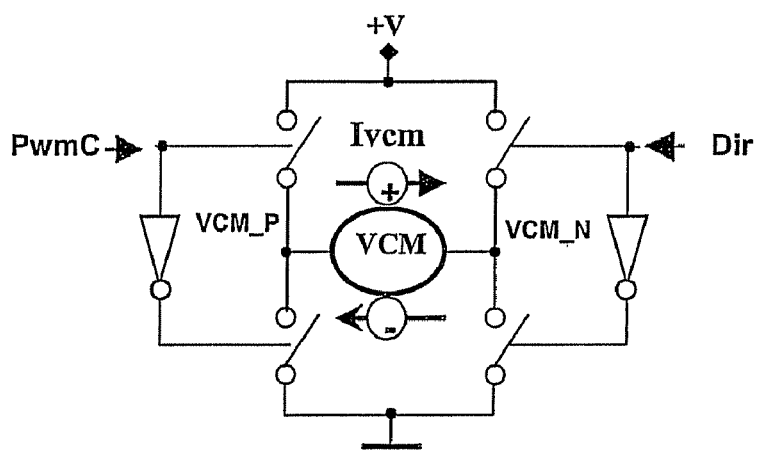

The waveforms of the current Ivcm through the load (that in the exemplary case is a voice-coil) and of the driving signals PwmC and Dir generated by the logic circuit of FIG. 6 are compared in FIG. 7. The logic driving signal Dir, that drives the half-bridge that defines the sign of the current to be controlled, is obtained by sampling the signal PwmB based upon the leading edge of the signal Y, on its turn generated as a logic XOR between the signals PwmA and PwmB.

The control circuit addresses issues caused by spurious switching of the logic driving signal because the latter is digitally generated in synchrony with the switching frequency and this would make it relatively insensitive to switching noise that corrupts the output voltage of the error amplifier ERROR AMPLIFIER.

Figure 8:
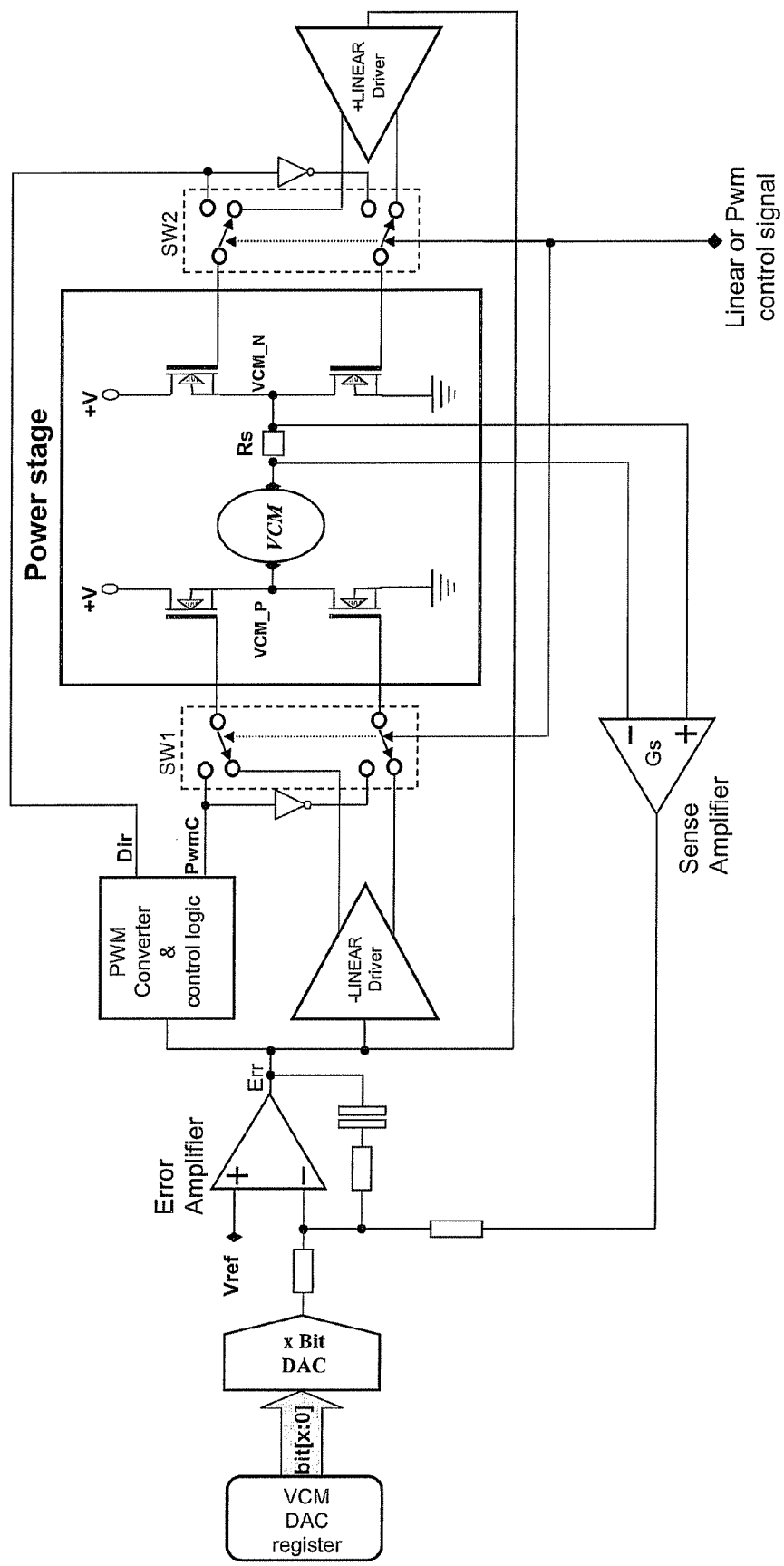
FIG. 8 is a block scheme of a system of this invention for controlling a power stage that drives a voice-coil motor in linear or PWM mode, that includes the circuit of FIG. 6.

Preferably, the control circuit is provided with linear driver LINEAR DRIVER, as shown in FIG. 8 and as disclosed in detail in the prior patent application EP 1, 641 115 the disclosure of which is herein incorporated by reference, that typically are class AB operational amplifiers, for controlling the electric load in linear mode when the current flowing through the load is smaller than a minimum pre-established threshold. This switch of the control mode of the electric load is useful when the load absorbs relatively small currents, thus reducing the difficulty of generating a driving signal PwmC with an excessively small duty-cycle.

That which is claimed:

1. A control circuit for a full-bridge stage to drive an electric load, the control circuit configured to generate a first PWM signal and a second PWM signal so that a difference between duty-cycles of the first and second PWM signals represents an amplitude of a drive current for the electric load, the control circuit also configured to generate a logic driving command of a half-bridge of the full-bridge stage a logic value of which corresponds to a sign of the drive current by combining the first and second PWM signals, the control circuit also configured to generate a third PWM driving signal of the other half-bridge of the full-bridge stage a duty-cycle of which corresponds to the amplitude of the drive current, the control circuit comprising:

a logic XOR gate configured to be input with the first and second PWM signals and generate therefrom a logic XOR signal;
  a logic sampling circuit configured to generate the logic driving command by sampling one of the first and second PWM signals based upon active switching edges of the logic XOR signal; and
  a second XOR gate configured to be input with the logic XOR signal and the logic driving command and generate therefrom the third PWM driving signal.

2. The control circuit of claim 1, wherein the logic sampling circuit comprises a D-type flip-flop clocked by the active switching edges of the logic XOR signal.

3. The control circuit of claim 1, wherein the electric load comprises a voice coil motor.

4. A control circuit for a full-bridge stage to drive an electric load and comprising:

PWM generation circuitry for generating a first PWM signal and a second PWM signal so that a difference between duty-cycles of the first and second PWM signals represents an amplitude of a drive current for the electric load;
  a logic XOR gate configured to be input with the first and second PWM signals and generate therefrom a logic XOR signal;
  a logic sampling circuit configured to generate a logic driving command of a half-bridge of the full-bridge stage, a logic value of which corresponds to a sign of the drive current, by sampling one of the first and second PWM signals based upon active switching edges of the logic XOR signal; and
  a second XOR gate configured to be input with the logic XOR signal and the logic driving command and generate therefrom a third PWM driving signal of the other half-bridge of the full-bridge stage, a duty-cycle of which corresponds to the amplitude of the drive current.

5. The control circuit of claim 4, wherein the logic sampling circuit comprises a D-type flip-flop clocked by the active switching edges of the logic XOR signal.

6. The control circuit of claim 4, wherein the electric load comprises a voice coil motor.

7. A control circuit for a full-bridge stage to drive an electric load, the control circuit configured to generate a first PWM signal and a second PWM signal so that a difference between duty-cycles of the first and second PWM signals represents an amplitude of a drive current for the electric load, the control circuit also configured to generate a logic driving command of a half-bridge of the full-bridge stage a logic value of which corresponds to a sign of the drive current by combining the first and second PWM signals, the control circuit also configured to generate a third PWM driving signal of the other half-bridge of the full-bridge stage a duty-cycle of which corresponds to the amplitude of the drive current, the control circuit comprising:

a first logic gate configured to be input with the first and second PWM signals and generate therefrom a first logic signal;
  a logic sampling circuit configured to generate the logic driving command by sampling one of the first and second PWM signals based upon active switching edges of the first logic signal; and
  a second logic gate configured to be input with the logic signal and the logic driving command and generate therefrom the third PWM driving signal.

8. The control circuit of claim 7, wherein the logic sampling circuit comprises a D-type flip-flop clocked by the active switching edges of the first logic signal.

9. The control circuit of claim 7, wherein the electric load comprises a voice coil motor.

10. A method of making control circuit for a full-bridge stage to drive an electric load, the method comprising:

configuring PWM generation circuitry to generate a first PWM signal and a second PWM signal so that a difference between duty-cycles of the first and second PWM signals represents an amplitude of a drive current for the electric load;

configuring a logic XOR gate to be input with the first and second PWM signals and generate therefrom a logic XOR signal;

configuring a logic sampling circuit to generate a logic driving command of a half-bridge of the full-bridge stage, a logic value of which corresponds to a sign of the drive current, by sampling one of the first and second PWM signals based upon active switching edges of the logic XOR signal; and configuring a second XOR gate to be input with the logic XOR signal and the logic driving command and generate therefrom a third PWM driving signal of the other half-bridge of the full-bridge stage, a duty-cycle of which corresponds to the amplitude of the drive current.

11. The method of claim 10, wherein the logic sampling circuit comprises a D-type flip-flop clocked by the active switching edges of the logic signal.

12. The method of claim 10, wherein the electric load comprises a voice coil motor.

\* \* \* \* \*